(12) United States Patent
Given

(10) Patent No.: US 8,414,942 B2
(45) Date of Patent: Apr. 9, 2013

(54) REDUCTION OF SORBIC ACID PRECIPITATION IN BEVERAGES

(75) Inventor: Peter Given, Ridgefield, CT (US)

(73) Assignee: PepsiCo, Inc., Purchase, NY (US)

( * ) Notice: Subject to any disclaimer, the term of this patent is extended or adjusted under 35 U.S.C. 154(b) by 30 days.

(21) Appl. No.: 13/034,097

(22) Filed: Feb. 24, 2011

(65) Prior Publication Data

US 2012/0219681 A1    Aug. 30, 2012

(51) Int. Cl.
*A23F 3/16*    (2006.01)

(52) U.S. Cl.
USPC ...................................... 426/330.3

(58) Field of Classification Search ........................ None
See application file for complete search history.

(56) References Cited

U.S. PATENT DOCUMENTS

| | | | |
|---|---|---|---|
| 3,021,219 A | 2/1962 | Melnick | |
| 4,399,150 A | 8/1983 | Ueno et al. | |
| 4,786,521 A | 11/1988 | Bennett et al. | |
| 5,888,569 A | 3/1999 | Jager et al. | |
| 6,126,980 A * | 10/2000 | Smith et al. | 426/330.3 |
| 2004/0086619 A1 | 5/2004 | Zhong et al. | |
| 2005/0053704 A1 | 3/2005 | Kemp | |
| 2007/0054026 A1 | 3/2007 | Grenville et al. | |
| 2007/0141203 A1 | 6/2007 | Cook | |
| 2007/0275140 A1 * | 11/2007 | Safko | 426/330.3 |
| 2009/0306210 A1 | 12/2009 | Behnam | |

FOREIGN PATENT DOCUMENTS

| | | |
|---|---|---|
| DE | 26 23 682 | 12/1976 |
| WO | 9721359 | 6/1997 |

OTHER PUBLICATIONS

Maurice Shachman Chapter 9, Syrup Making—The Heart of the Process in the Soft Drinks Companion : A Technical Handbook for the Beverage Industry; CRC Press 2004 http://www.crcnetbase.com/doi/pdf/10.1201/9780203492123.ch9; accessed on May 10, 2012.*
Database WPI Week 201063, Thomson Scientific AN 2010-L68981, XP002676321, dated Aug. 25, 2010.
PCT/US2012/025338, International Search Report and Written Opinion, dated May 31, 2012.
U.S. Appl. No. 13/033,777, Final Office Action mailed Aug. 29, 2012.
U.S. Appl. No. 13/034,023, Final Office Action mailed Sep. 6, 2012.

* cited by examiner

*Primary Examiner* — Humera Sheikh
*Assistant Examiner* — Subbalakshmi Prakash
(74) *Attorney, Agent, or Firm* — Banner & Witcoff, Ltd

(57) ABSTRACT

A method for producing a stable beverage preserved with sorbic acid. A beverage syrup is diluted and sorbate is simultaneously introduced into the diluted syrup to form the beverage.

14 Claims, No Drawings

REDUCTION OF SORBIC ACID PRECIPITATION IN BEVERAGES

FIELD OF THE INVENTION

The invention relates to a method for incorporating sorbic acid into beverages. In particular, the method relates to a method for incorporating sorbic acid into beverages while minimizing the potential for sorbic acid precipitation.

BACKGROUND OF THE INVENTION

Consumer demand for refreshing beverages has led to introduction of many types of beverages. Commercial distribution of beverages requires that the beverages be protected from spoilage if not consumed or used upon manufacture.

Beverages can be maintained under conditions that significantly retard activity of microbial and other spoilage agents, such as bacteria, molds, and fungi. Such conditions often require, for example, refrigeration until the beverage is consumed. Maintenance of such conditions often is not possible or practical.

Another method of retarding microbial activity is to add preservatives to the beverage. Many preservatives are known. However, known preservatives typically have disadvantages that limit use in beverages. For example, preservatives may impart off taste to the beverage when used in a concentration sufficient to provide preservative effect. Preservatives also may adversely affect the appearance of the beverage.

Some preservatives precipitate or form crystals or a floc under conditions of manufacture or storage of a beverage. Some preservatives may cloud the beverage, which is unacceptable to the consumer if the beverage is expected to be clear. Such phenomena typically are unacceptable consumers not only because of certain preconceptions relating to appearance, but also because consumers often equate cloud or particulate formation with spoilage of the beverage. Floc, crystals, or sediment or sediment-like deposits in a beverage bottle also are unacceptable to consumers because the solids typically taste bad and present an unpleasant mouthfeel (for example, a gritty or sandy mouthfeel).

Beverages often are made from concentrates that are diluted. Beverages then are provided immediately to a consumer, or are packaged for distribution and consumption. The concentrates, often called syrups, are conveniently shipped, and then used to make beverages in a one-step process. Thus, it is convenient to put all ingredients, including preservatives, into syrup. However, because syrup is concentrated, it often is not possible to dissolve enough preservative in the syrup to preserve a beverage made therefrom.

Thus, there exists a need for a preservative that does not form solids, such as floc, crystals, sediment or sediment-like deposits, or precipitates. There also exists a need for a preservative that does not cloud an optically clear beverage.

BRIEF SUMMARY OF THE INVENTION

A first embodiment of the invention is directed to a method for forming a stable beverage preserved with sorbic acid. In another embodiment of the invention, the stable preserved beverage has a shelf life of at least about four weeks, and up to about 20 weeks, at a temperature between about 40° F. and about 110° F.

DETAILED DESCRIPTION OF THE INVENTION

As used herein, 'syrup' or 'beverage syrup' is a beverage precursor to which a fluid, typically water, is added to form a ready-to-drink beverage, or a 'beverage.' Typically, the volumetric ratio of syrup to water is between about 1:3 to about 1:8, more typically between about 1:4 and about 1:5. The volumetric ratio of syrup to water also is expressed as a "throw." A 1:5 ratio, which is a ratio commonly used within the beverage industry, is known as a "1+5 throw."

Sorbic acid and sorbates act as preservatives. However, at the pH levels typically found in syrups, and at a typical sorbate concentration in syrup sufficient to provide commercially useful preservative activity in beverages made therefrom, sorbic acid is likely to precipitate.

Beverages made in accordance with embodiments of the invention typically comprise water, sorbic acid preservative, sweetener, pH-neutral compounds, acids and acidic compounds, and flavors and flavor compounds. These compounds typically include taste modifiers, nutrients, colors, and other compounds, such as emulsions, surfactants, buffers, and antifoaming compounds, typically found in beverages.

As used herein, "beverage" refers to beverages such as soft drinks, fountain beverages, frozen ready-to-drink beverages, coffee beverages, tea beverages, sport drinks, and alcoholic products. The beverage may be carbonated or noncarbonated. In addition, in certain embodiments of the invention, "beverage" refers also to juice, dairy, and other non-clear beverages. Beverages according to embodiments of the invention can be clear or non-clear.

"Clear" refers to optical clarity, i.e., a clear beverage can be as clear as water. In a preferred embodiment of the present invention, the beverage concentrate and/or the finished beverage are clear as evidenced by a reading by a HACH Turbidimeter (Model 2100AN, Hach Company, Loveland, Colo.). Readings of up to about 3 NTU (Nephelometric Turbidity Units) are considered very clear, and values up to about 5 NTU can be considered clear. When such a reading is as high as around 6 to about 10 NTU, a sample is not clear, but rather very slightly hazy or slightly hazy. At about 15 NTU, a beverage is hazy. Thus, a beverage having turbidity not greater than about 5 NTU is said to be a clear beverage, with values of about 6 NTU being very slightly hazy to slightly hazy at 10 NTU.

As used herein, a "stable" finished beverage refers to a clear beverage in which no phase separation occurs, i.e., no crystal, floc, sediment, haze, cloud, or precipitation at room temperature at 40° F., 70° F., 90° F., and 110° F. over a period of 4 weeks, typically over a period of more than 20 weeks, and more typically more than 6 months, i.e., within the typical shelf-life of the finished beverage.

A "preserved" beverage shows no significant microbiological activity during the period of stability.

The concentration of sorbic acid necessary to achieve commercial preservation of a beverage essentially without using other preservatives typically requires a sorbate concentration in the syrup from which the beverage is made greater than the concentration at which precipitation occurs (about 500 ppm).

The inventors have discovered that sorbic acid can be introduced into a beverage in concentrations sufficient to achieve commercial preservation but without inducing sorbic acid precipitation by adding sorbate to the beverage together with the syrup and throw water. Although the inventors do not wish to be bound by theory, it is believed that the sorbic acid concentration stays below about 500 ppm, which prevents sorbic acid from precipitating. As the skilled practitioner recognizes, beverage syrups typically have a pH in the range of between about 2 and about 4. Thus, sorbic salts introduced during dilution of beverage syrup convert to sorbic acid, but remain soluble because, unlike syrup, the beverage contains an abundance of water.

As typically used herein, 'water' is water, typically conditioned and treated, of a quality suitable for manufacturing beverages. Excessive hardness may induce precipitation of sorbic acid. With the guidance provided herein, the skilled practitioner will be able to provide water of sufficient quality.

"Fluid" means water and juice, dairy, or other liquid beverage products that form part of beverages. For example, dairy components may be added in quantity that does not provide sufficient hardness to induce sorbic acid precipitation. With the guidance provided herein, the skilled practitioner can determine whether addition of dairy, juice or other liquid beverage product is suitable for use in embodiments of the invention.

For brevity, the invention will be described as it relates to water as the fluid. However, the description herein also relates to fluid, as defined herein. With the guidance provided herein, the skilled practitioner will be able to provide fluids suitable for use in forming syrup.

In accordance with embodiments of the invention, beverages include sorbic acid as preservative. In particular, sorbic acid typically is introduced as a sorbate, typically as alkali metal salts of sorbic acid. Typically-used alkali metals are sodium and potassium. In a more typical embodiment of the invention, potassium sorbate is used. Thus, sorbic acid is introduced as a sorbic acid compound selected from the group consisting of sorbic acid, sorbates, and blends thereof. For simplicity, the invention is described as it applies to sorbic acid.

Although beverages that form embodiments of the invention are preserved essentially with sorbic acid, other preservatives are known to the skilled practitioner, and may be included with the sorbic acid. Other preservatives include, for example, chelators, such as the EDTA's, including disodium EDTA, calcium disodium EDTA, and sodium hexametaphosphate (SHMP); antimicrobials, such as benzoates, particularly the alkali metal benzoates; propionates; lauric arginate, and salts of cinnamic acid; and antioxidants, including tocopherols, BHA, and BHT. In accordance with embodiments of the invention, other preservatives are used sparingly, and most typically not at all. However, if these preservatives are used, they can be introduced as part of the syrup. Sorbic acid also can be introduced in the syrup at a concentration typically below 200 ppm to essentially preclude precipitation in the syrup, if desired, and supplemented in accordance with embodiments of the invention to achieve preservative-effective concentration in the resultant beverage. With the guidance provided herein, the skilled practitioner can select appropriate preservatives.

The concentration of sorbic acid in the beverage typically is less than about 500 ppm. In aqueous solution at pH of between about 2.5 and about 4 at about 20° C., which are typical manufacturing conditions for beverages, sorbic acid precipitation begins at sorbate concentration of about 500 ppm. Further, as the skilled practitioner recognizes, other compounds in the beverage also affect sorbic acid solubility adversely. For example, water hardness lowers the solubility of sorbic acid. Therefore, addition of sorbate in accordance with embodiments of the invention is contemplated at a wide range of sorbic acid concentrations.

The concentration of sorbic acid required to achieve commercial preservation conditions also relates to other conditions of the beverage. For example, carbonation will decrease the concentration of sorbic acid required to achieve a given preservation performance. In contradistinction, lowering the pH lowers the concentration of sorbic acid required to achieve a given preservation performance With the guidance provided herein, the skilled practitioner will be able to establish a sorbic acid concentration that suitably preserves a beverage.

Sweeteners of beverage embodiments of the invention include caloric carbohydrate sweeteners, natural high-potency sweeteners, synthetic high-potency sweeteners, other sweeteners, and combinations thereof. With the guidance provided herein, a suitable sweetening system (whether a single compound or combination thereof) can be selected.

Examples of suitable caloric carbohydrate sweeteners include sucrose, fructose, glucose, erythritol, maltitol, lactitol, sorbitol, mannitol, xylitol, D-tagatose, trehalose, galactose, rhamnose, cyclodextrin (e.g., α-cyclodextrin, β-cyclodextrin, and γ-cyclodextrin), ribulose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, glucosamine, mannosamine, fucose, glucuronic acid, gluconic acid, glucono-lactone, abequose, galactosamine, xylo-oligosaccharides (xylotriose, xylobiose and the like), gentio-oligoscaccharides (gentiobiose, gentiotriose, gentiotetraose and the like), galacto-oligosaccharides, sorbose, nigero-oligosaccharides, fructooligosaccharides (kestose, nystose and the like), maltotetraol, maltotriol, malto-oligosaccharides (maltotriose, maltotetraose, maltopentaose, maltohexaose, maltoheptaose and the like), lactulose, melibiose, raffinose, rhamnose, ribose, isomerized liquid sugars such as high fructose corn/starch syrup (e.g., HFCS55, HFCS42, or HFCS90), coupling sugars, soybean oligosaccharides, and glucose syrup.

Other sweeteners suitable for use in embodiments provided herein include natural, synthetic, and other high-potency sweeteners. As used herein, the phrases "natural high-potency sweetener," "NHPS," "NHPS composition," and "natural high-potency sweetener composition" are synonymous. "NHPS" means any sweetener found in nature which may be in raw, extracted, purified, treated enzymatically, or any other form, singularly or in combination thereof and characteristically has a sweetness potency greater than sucrose, fructose, or glucose, yet has fewer calories. Non-limiting examples of NHPS's suitable for embodiments of this invention include rebaudioside A, rebaudioside B, rebaudioside C (dulcoside B), rebaudioside D, rebaudioside E, rebaudioside F, dulcoside A, rubusoside, stevia, stevioside, mogroside IV, mogroside V, Luo Han Guo sweetener, siamenoside, monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobtain, baiyunoside, osladin, polypodoside A, pterocaryoside A, pterocaryoside B, mukurozioside, phlomisoside I, periandrin I, abrusoside A, and cyclocarioside I.

NHPS also includes modified NHPS's. Modified NHPS's include NHPS's which have been altered naturally. For example, a modified NHPS includes, but is not limited to, NHPS's which have been fermented, contacted with enzyme, or derivatized or substituted on the NHPS. In one embodiment, at least one modified NHPS may be used in combination with at least one NHPS. In another embodiment, at least one modified NHPS may be used without a NHPS. Thus, modified NHPS's may be substituted for a NHPS or may be used in combination with NHPS's for any of the embodiments described herein. For the sake of brevity, however, in the description of embodiments of this invention, a modified NHPS is not expressly described as an alternative to an unmodified NHPS, but it should be understood that modified NHPS's can be substituted for NHPS's in any embodiment disclosed herein.

As used herein, the phrase "synthetic sweetener" refers to any composition that is not found in nature and is a high potency sweetener. Non-limiting examples of synthetic sweeteners suitable for embodiments of this invention include sucralose, acesulfame potassium (acesulfame K or aceK) or other salts, aspartame, alitame, saccharin, neohesperidin dihydrochalcone, cyclamate, neotame, N-[3-(3-hydroxy-4-methoxyphenyl)propyl]-L-α-aspartyl]-L-phenylalanine 1-methyl ester, N-[3-(3-hydroxy-4-methoxyphenyl)-3-methylbutyl]-L-α-aspartyl]-L-phenylalanine 1-methyl ester, N-[3-(3-methoxy-4-hydroxyphenyl)propyl]-L-α-aspartyl]-L-phenylalanine 1-methyl ester, and salts thereof.

Acids suitably used in embodiments of the invention include food grade acids typically used in beverages and beverage syrups. Buffers include salts of food grade acids that form pH buffers, i.e., provide a combination of compounds that tends to maintain the pH at a selected level. Food acids for use in particular embodiments include, but are not limited to, phosphoric acid, citric acid, ascorbic acid, adipic acid, fumaric acid, lactic acid, malic acid, tartaric acid, acetic acid, oxalic acid, tannic acid, caffeotannic acid, and combinations thereof.

Flavors routinely used in beverages are suitably used in embodiments of the invention. The skilled practitioner recognizes that some flavors will haze or add a cloudy appearance to a beverage. Therefore, such a flavor, which often may be an emulsion, would not be suitably used in a clear beverage. Suitable flavors include flavors that are not incompatible with the type of beverage. That is, a clear beverage would not typically be flavored with a flavor that would cloud the beverage, introduce haze, or otherwise make the beverage less attractive to the consumer. However, subject to this condition known to the skilled practitioner, known flavors suitably are used, as appropriate.

Any flavor, flavor compound, or flavor system consistent with the type of beverage suitably is used in embodiments of the invention. Further, the flavor may be in any form, such as powder, emulsion, micro-emulsion, and the like. Some of these forms may induce clouding in a beverage, and so would not be used in a clear beverage. Typical flavors include almond, amaretto, apple, sour apple, apricot, nectarine, banana, black cherry, cherry, raspberry, black raspberry, blueberry, chocolate, cinnamon, coconut, coffee, cola, cranberry, cream, irish cream, fruit punch, ginger, grand marnier, grape, grapefruit, guava, grenadine, pomegranate, hazelnut, kiwi, lemon, lime, lemon/lime, tangerine, mandarin, mango, mocha, orange, papaya, passion fruit, peach, pear, peppermint, spearmint, pina colada, pineapple, root beer, birch beer, sarsaparilla, strawberry, boysenberry, tea, tonic, watermelon, melon, wild cherry, and vanilla. Exemplary flavors are lemon-lime, cola, coffee, tea, fruit flavors of all types, and combinations thereof.

Surfactants also may be present in the beverage. Surfactant may be added as an ingredient of the syrup. The skilled practitioner recognizes that surfactant also may be introduced into the syrup or beverage as part of a component ingredient. Surfactants typically suitable for use in embodiments of this invention include, but are not limited to, the polysorbates (e.g., polysorbate 20, polysorbate 40, polysorbate 60, polysorbate 80), sodium dodecylbenzenesulfonate, dioctyl sulfosuccinate or dioctyl sulfosuccinate sodium, sodium dodecyl sulfate, cetylpyridinium chloride (hexadecylpyridinium chloride), hexadecyltrimethylammonium bromide, sodium cholate, carbamoyl, choline chloride, sodium glycocholate, sodium taurodeoxycholate, lauric arginate, sodium stearoyl lactylate, sodium taurocholate, lecithins, sucrose oleate esters, sucrose stearate esters, sucrose palmitate esters, sucrose laurate esters, and other emulsifiers.

Beverage syrup used in embodiments of the invention is made in accordance with methods known to skilled practitioners. The method by which the syrup is made does not form a part of this invention. Therefore, any beverage syrup or concentrate made in accordance with any method is suitably used in embodiments of the invention.

Embodiments of the invention are directed to manufacture of ready-to-drink beverages preserved essentially with sorbic acid. Such beverages are made by mixing an aliquot of syrup with an appropriate quantity of diluting water and a quantity of sorbate sufficient to preserve the beverage. Any dilution rate, or throw, can be used. The volumetric ratio of syrup to water is between about 1:3 and about 1:8, more typically between about 1:4 and about 1:5. Most typically, the ratio of 1 volume of syrup with 5 volumes of water or other fluid, also known as a "1+5 throw," is used.

In embodiments of the invention, an aliquot of syrup is mixed with diluent water and the appropriate quantity of sorbate in any manner that provides a uniform beverage solution containing syrup and sorbate without inducing sorbic acid precipitation. Typically, the syrup is essentially devoid of sorbic acid compound. Thus, sorbic acid compound can be added only once, in accordance with embodiments of the invention. The process can be a batch or continuous process. A large quantity of beverage can be packaged in multiple containers, or beverage can be prepared by combining syrup, diluent, and water just before filling a container, or by separately introducing an aliquot of syrup, diluent, and sorbate into a container. Typically, known beverage bottling machines can be used or easily adapted to package beverage embodiments of the invention.

To avoid sorbic acid precipitation, sorbate is introduced with a diluent or after diluent has been added, as, typically, a sufficient concentration of sorbate cannot be obtained in syrup. Although the inventors do not wish to be bound by theory, it is believed that adding sorbate with diluent, or after diluent has been introduced, keeps the sorbic acid concentration below the concentration at which precipitation occurs in beverages.

In embodiments of the invention, sorbate is introduced in a suitable manner known to skilled practitioners. Sorbate can be introduced in solid form, but typically is introduced as a solution. Any manner of introducing sorbate to the beverage that can achieve the desired sorbic acid concentration in beverage is suitably used in embodiments of the invention. For example, an aspirator can be used to introduce a sorbate solution to a flowing stream of diluent water or beverage. The skilled practitioner is familiar with this and other techniques for combining solids and fluids, and will, with the guidance provided herein, be able to select a suitable method for so doing.

Typically, if a solution of sorbate is used, the volume of diluent, or throw water, typically is reduced by the volume of the sorbate solution. As the skilled practitioner recognizes, this reduction for diluent will ensure that the beverage will have the correct concentration.

Beverage embodiments of the invention are stable beverages preserved with sorbic acid having a shelf life of at least about four weeks at a temperature between about 40° F. and about 110° F. More typically, beverage embodiments of the invention have a shelf life of at least about 6 weeks, and even more typically at least about 16 weeks.

The following example illustrates, but does not limit, the invention.

Example 1

One hundred volumes of lemon lime flavored syrup sweetened with a natural high-potency solution are diluted with water to form lemon lime flavored beverage. A sorbate solution is made by dissolving potassium sorbate in thirty volumes of water to form a solution having a sorbate concentration of 1200 ppm.

The syrup then is diluted with 470 volumes of water. As the syrup and water are blended with vigorous agitation, sorbate solution is introduced to form 600 volumes of beverage having a sorbate concentration of about 200 ppm to about 400 ppm.

The beverage is a fresh-tasting lemon lime flavored clear beverage. The beverage is stored at room temperature for 16 weeks, and remains clear and without any solid precipitate, sediment, crystal, floc, cloud, or haze.

Example 2

Ten volumes of cola-flavored syrup are sweetened with a high-fructose corn syrup. A sorbate solution is made by dissolving sodium sorbate in 2 volumes of water to form a solution having a sorbate concentration of 900 ppm.

Syrup then is diluted with 48 volumes of water and the 2 volumes of sorbate solution. Carbonation is introduced at the appropriate time during packaging. The resultant cola beverage is packaged on a standard bottling machine.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, the throw is 1:4, 1:6, or 1:8 in embodiments of the invention.

I claim:

1. A method for producing a stable beverage preserved with sorbic acid, said method comprising forming a beverage syrup essentially devoid of sorbic acid compound; and diluting the beverage syrup with diluent water while simultaneously introducing sorbic acid compound into the beverage syrup or the diluent water at a rate to maintain an amount of sorbic acid in the diluted beverage syrup less than about 500 ppm to form the stable beverage;

wherein sorbic acid is essentially the sole preservative and sorbic acid precipitation is precluded in the beverage.

2. The method of claim 1, wherein the sorbic acid compound is selected from the group consisting of sorbic acid, alkali metal salts of sorbic acid, and blends thereof.

3. The method of claim 1, wherein the ratio of the volume of beverage syrup to the volume of diluent water is between about 1:3 and about 1:8.

4. The method of claim 1, wherein the ratio of the volume of beverage syrup to the volume of diluent water is between about 1:4 and about 1:5.

5. The method of claim 3, wherein the sorbic acid compound is an aqueous solution and the water in the solution forms part of the volume of diluent water.

6. The method of claim 4, wherein the sorbic acid compound is an aqueous solution and the water in the solution forms part of the volume of diluent water.

7. The method of claim 1, wherein the sorbic acid concentration in the diluted beverage syrup and the beverage is less than about 200 ppm.

8. A method for producing a stable beverage preserved with sorbic acid by diluting a beverage syrup essentially devoid of sorbic acid compound with a volume of diluent water, said method comprising (a) diluting the beverage syrup with a fraction of the diluent water to form diluted beverage syrup; and (b) diluting the diluted beverage syrup with the remainder of the diluent water while simultaneously introducing sorbic acid compound into the diluted beverage syrup or the diluent water at a rate to maintain an amount of sorbic acid in the diluted beverage syrup less than about 500 ppm to form the stable beverage;

wherein sorbic acid is essentially the sole preservative and sorbic acid precipitation is precluded in the beverage.

9. The method of claim 8, wherein the sorbic acid compound is selected from the group consisting of sorbic acid, alkali metal salts of sorbic acid, and blends thereof.

10. The method of claim 8, wherein the ratio of the volume of beverage syrup to the volume of diluent water is between about 1:3 and about 1:8.

11. The method of claim 8, wherein the ratio of the volume of beverage syrup to the volume of diluent water is between about 1:4 and about 1:5.

12. The method of claim 10, wherein the sorbic acid compound is an aqueous solution and the water in the solution forms part of the volume of diluent water.

13. The method of claim 11, wherein the sorbic acid compound is an aqueous solution and the water in the solution forms part of the volume of diluent water.

14. The method of claim 8, wherein the sorbic acid concentration in the diluted beverage syrup and the beverage is less than about 200 ppm.

* * * * *